(12) United States Patent
Okuda

(10) Patent No.: US 8,620,212 B2
(45) Date of Patent: Dec. 31, 2013

(54) RELAY STATION, RADIO BASE STATION AND COMMUNICATION METHOD

(75) Inventor: Masato Okuda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1239 days.

(21) Appl. No.: 11/808,061

(22) Filed: Jun. 6, 2007

(65) Prior Publication Data

US 2008/0045148 A1 Feb. 21, 2008

(30) Foreign Application Priority Data

Aug. 17, 2006 (JP) ................................. 2006-222449

(51) Int. Cl.
*H04B 7/15* (2006.01)

(52) U.S. Cl.
USPC ................................ 455/18; 455/15; 370/315

(58) Field of Classification Search
USPC .................................................. 455/13.1, 24
See application file for complete search history.

(56) References Cited

U.S. PATENT DOCUMENTS

| | | | |
|---|---|---|---|
| 6,091,763 A | 7/2000 | Boetzel et al. | |
| 2004/0176028 A1 | 9/2004 | Dibernardo | |
| 2005/0059342 A1* | 3/2005 | Engels et al. | 455/7 |
| 2006/0046643 A1* | 3/2006 | Izumikawa et al. | 455/7 |
| 2007/0087691 A1 | 4/2007 | Lee et al. | |

FOREIGN PATENT DOCUMENTS

| | | |
|---|---|---|
| CN | 1551532 | 12/2004 |
| KR | 2007036269 A * | 4/2007 |
| WO | 95/35603 | 12/1995 |
| WO | 96/07250 | 3/1996 |
| WO | 03/058984 | 7/2003 |
| WO | 2005/067173 | 7/2005 |

OTHER PUBLICATIONS

IEEE Std. 802.16/2004; (Revision of IEEE Std. 802.16/2001); IEEE Standard for Local and metropolitan area networks; "Part 1: Air Interface for Fixed Broadband Wireless Access Systems"; IEEE Computer Society and the IEEE Microwave Theory and Techniques Society; Sponsored by the LAN/MAN Standards Committee. IEEE 3 Park Avenue, New York, NY 10016-5997, USA; Dated Oct. 1, 2004 [Print SH95246; PDF: SS95246].

IEEE Std. 802.16e-2005 and IEEE Std. 802.16-2004/Cor1-2005 (Amendment and Corrigendum to IEEE Std. 802.16-2004); IEEE Standard for Local and metropolitan area networks; Part 16: Air Interface for Fixed and Mobile Broadband Wireless Access Systems; Amendment 2: Physical and Medium Access Control Layers for Combined Fixed and Mobile Operation in Licensed Bands and Corrigendum 1; IEEE Computer Society and the IEEE Microwave Theory and Techniques Society; Sponsored by the LAN/MAN Standards Committee; IEEE, 3 Park Avenue, New York.

(Continued)

*Primary Examiner* — Philip J Sobutka
(74) *Attorney, Agent, or Firm* — Myers Wolin, LLC

(57) ABSTRACT

A relay station comprising a control unit is used in order to control a transmission processing device and a reception processing device to eliminate overlap of the receiving period to receive a radio signal from the radio base station and the transmitting period to transmit a radio signal to a radio terminal under the control. Moreover, a control unit is provided to control the transmission processing device and the reception processing device to eliminate overlap of the transmitting period to transmit a radio signal to the radio base station and the reception period to receive a radio signal from the radio terminal.

14 Claims, 12 Drawing Sheets

RADIO COMMUNICATION SYSTEM

(56) References Cited

OTHER PUBLICATIONS

Fang-Ching Ren, et al.; "Recommendation on PMP Mode Compatible TDD Frame Structure"; IEEE 802.16 Presentation Submission Template (Rev.8.3); Document Number: IEEE C802.16mmr-05/027r1; Venue: IEEE 802.16 Session #39, Taipei, Taiwan; Submitted Nov. 11, 2005.

The extended European search report with the European search opinion issued for corresponding European Patent Application No. 07109825.5 dated Apr. 26, 2012.

* cited by examiner

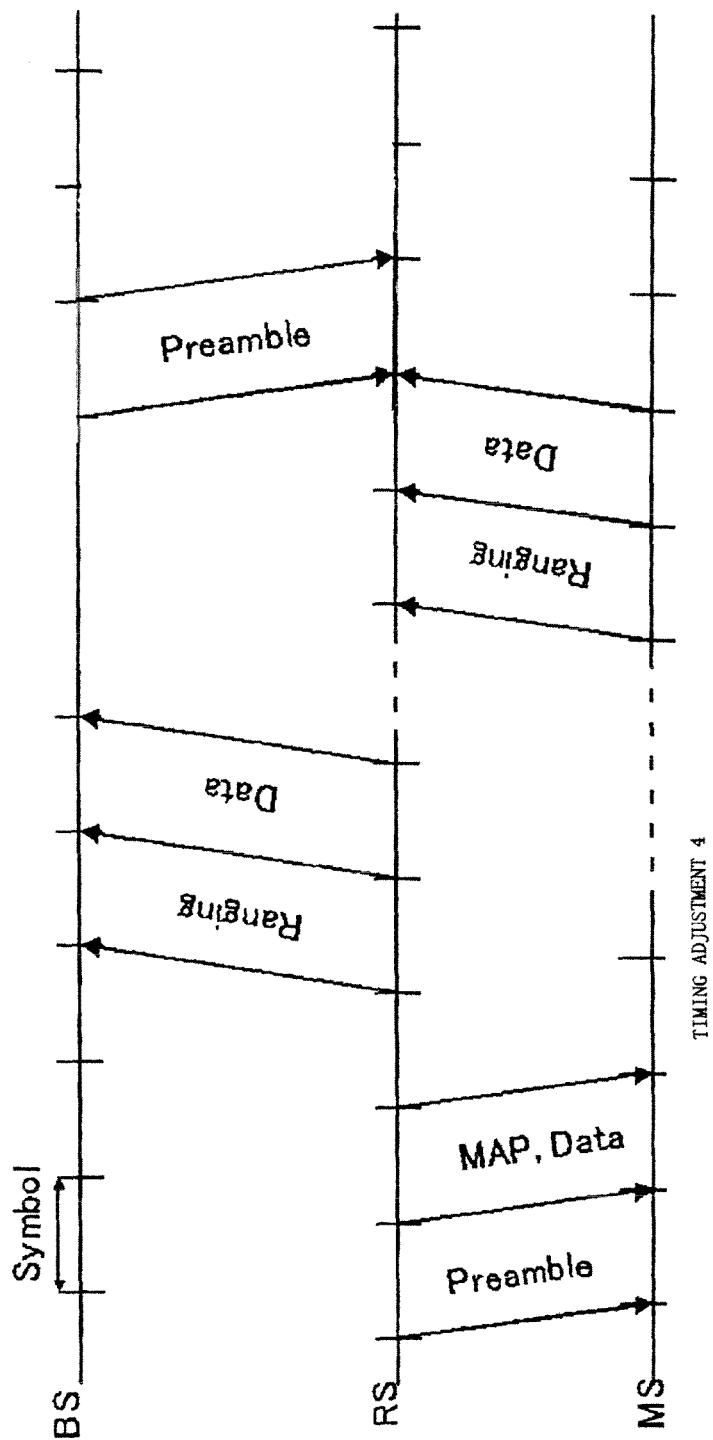

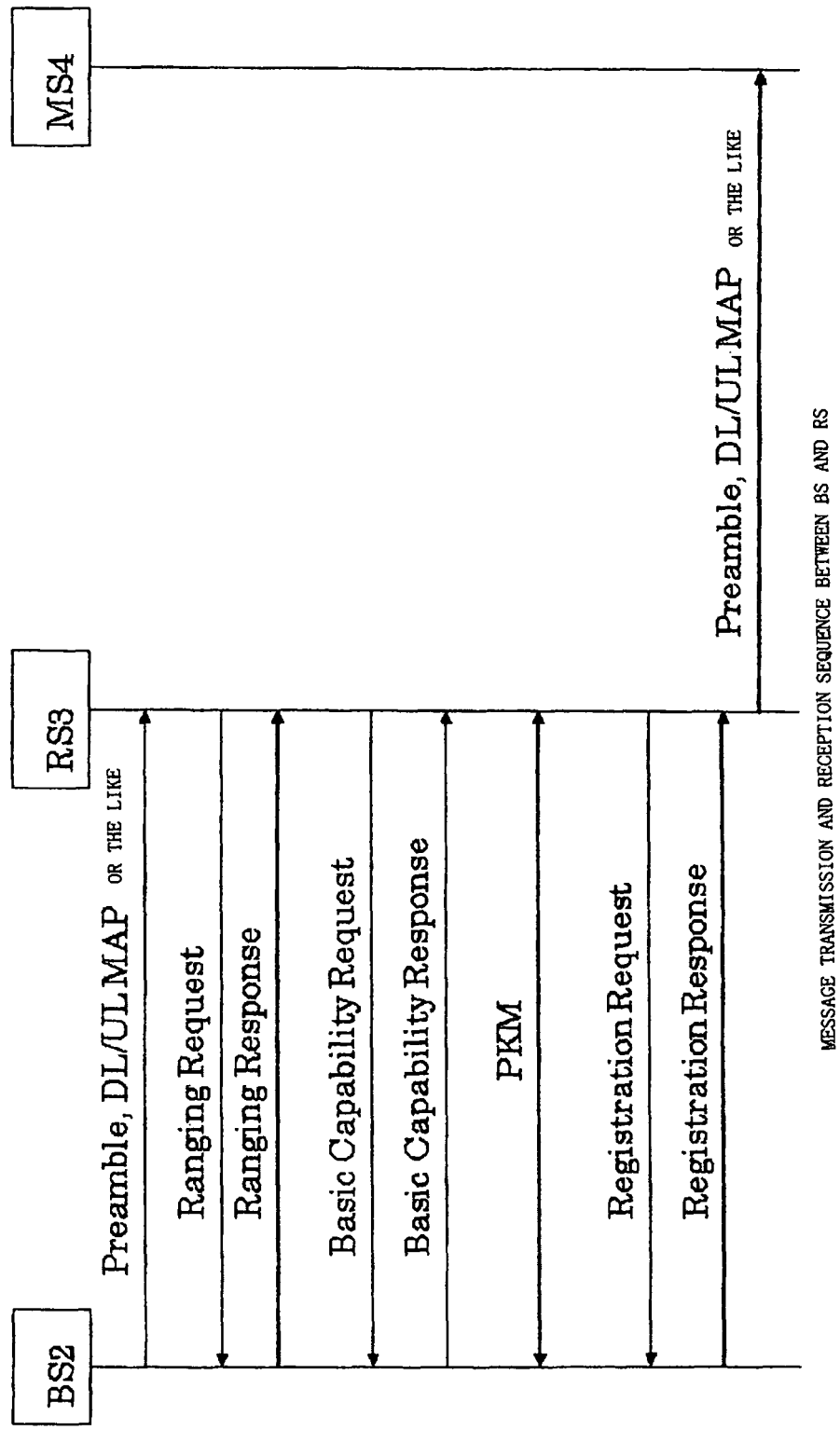

RELAY STATION, RADIO BASE STATION AND COMMUNICATION METHOD

CROSS REFERENCE TO RELATED APPLICATION

This application is related to and claims priority to Japanese Application No. 2006-222449 filed Aug. 17, 2006 in the Japanese Patent Office, the contents of which are incorporated by reference herein.

BACKGROUND OF THE INVENTION

1. Field of the Invention

The present invention relates to a relay station, a radio base station, and a communication method between these stations for utilizing radio communication. The present invention is suitably used for addition of relay stations on the basis of the radio communication system specified, for example, in IEEE802.16.

2. Description of the Related Art

A radio communication system to realize communication via a radio communication path is now spreading in the world-wide scale as a representative system of the WCDMA and CDMA 2000 or the like. In this radio communication system, a plurality of radio base stations are provided for service areas and a radio terminal makes communication with the other communication devices (communication terminals) via any of the radio base stations. Moreover, in such system, a service area formed by a base station is overlapped with another service area formed by an adjacent base station. Therefore the communication can be maintained by a handover process even though radio environment of the communication gets worse.

Moreover, as a radio system, a technology for example, code division multiplex, time division multiplex, frequency multiplex, and OFDM (OFDMA) or the like is employed and thereby a plurality of radio terminals can be connected simultaneously to a radio base station.

However, a radio terminal is sometimes located in the area out of the service area where a radio base station can make radio communication. In this case, a radio terminal cannot receive radio signals from a radio base station and cannot receive the service. Therefore, a system has been proposed, wherein relay stations are allocated within the area for making radio communication with a radio base station and the radio terminal and the radio base station can make radio communication via a relay station.

Particularly, the task group of 802.16j is now discussing introduction of such relay station (RS).

Matters in relation to the IEEE802.16 are disclosed, for example, in the IEEE Std802. 16TM-2004 and the IEEE Std802. 16eTM-2005.

SUMMARY OF THE INVENTION

According to the background technology explained above, a radio terminal is capable of making radio communication with a radio base station via a relay station but since a relay station is required to make radio communication not only with the radio terminal but also with the radio base station, it must be discussed how realize respective radio communications.

Therefore, an object of the present invention is that it is required to coordinate the radio communication between a relation station and a radio base station and the radio communication between a relay station and a radio terminal.

It is also an object to enhance application efficiency of radio channel.

Moreover, it is also another object of the present invention to obtain any advantage lead from any of the following embodiments but cannot be obtained by prior art.

The present invention utilizes a relay station comprising a control unit controlling a transmission processing device and a reception processing device not to allow overlap of a first receiving period for receiving radio signals from a radio base station and a first transmitting period for transmitting radio signals to a radio terminal under control of said relay station.

Preferably said first transmitting period overlaps a second transmitting period for transmitting radio signals from said radio base station to a radio terminal under control of said radio base station.

Preferably said control unit controls said transmission processing device and said reception processing device to provide a third transmitting period to transmit radio signals to said radio base station following said transmitting period.

Preferably a preamble signal is included in the radio signals received in said first receiving period and the radio signals transmitted in said first transmitting period.

The present invention utilizes a relay station comprising a control unit controlling a reception processing device and a transmission processing device not to allow overlap of a first transmitting period for transmitting a radio signal to a radio base station and a first receiving period for receiving a radio signal from a radio terminal.

Preferably said first receiving period overlaps with a second receiving period where said radio base station receives radio signals from a radio terminal under the control of said radio base station.

Preferably said control unit controls said transmission processing device and said reception processing device to provide a third receiving period for receiving radio signals from said radio base station following said first receiving period.

The present invention utilizes a radio communication system comprising a radio base station having a control unit controlling a transmitting period for transmission of radio signals and a receiving period for receiving radio signals and a relay station having a control unit controlling not to conduct a receiving process corresponding to said transmitting period and a transmitting process corresponding to said receiving period within a communication period with a radio terminal under control thereof by controlling a transmission timing of a preamble signal transmitted to the radio terminal under the control thereof based on a offset time and a preamble signal transmitted from said radio base station within said transmitting period.

Preferably said offset time is transmitted to said relay station from said radio base station.

BRIEF DESCRIPTION OF THE DRAWINGS

FIG. 11 is an exemplary illustration of a timing adjustment 4.

FIG. 12 is an exemplary illustration of a message transmission and reception sequence between BS and RS.

DETAILED DESCRIPTION OF THE PREFERRED EMBODIMENTS

Figure 1:
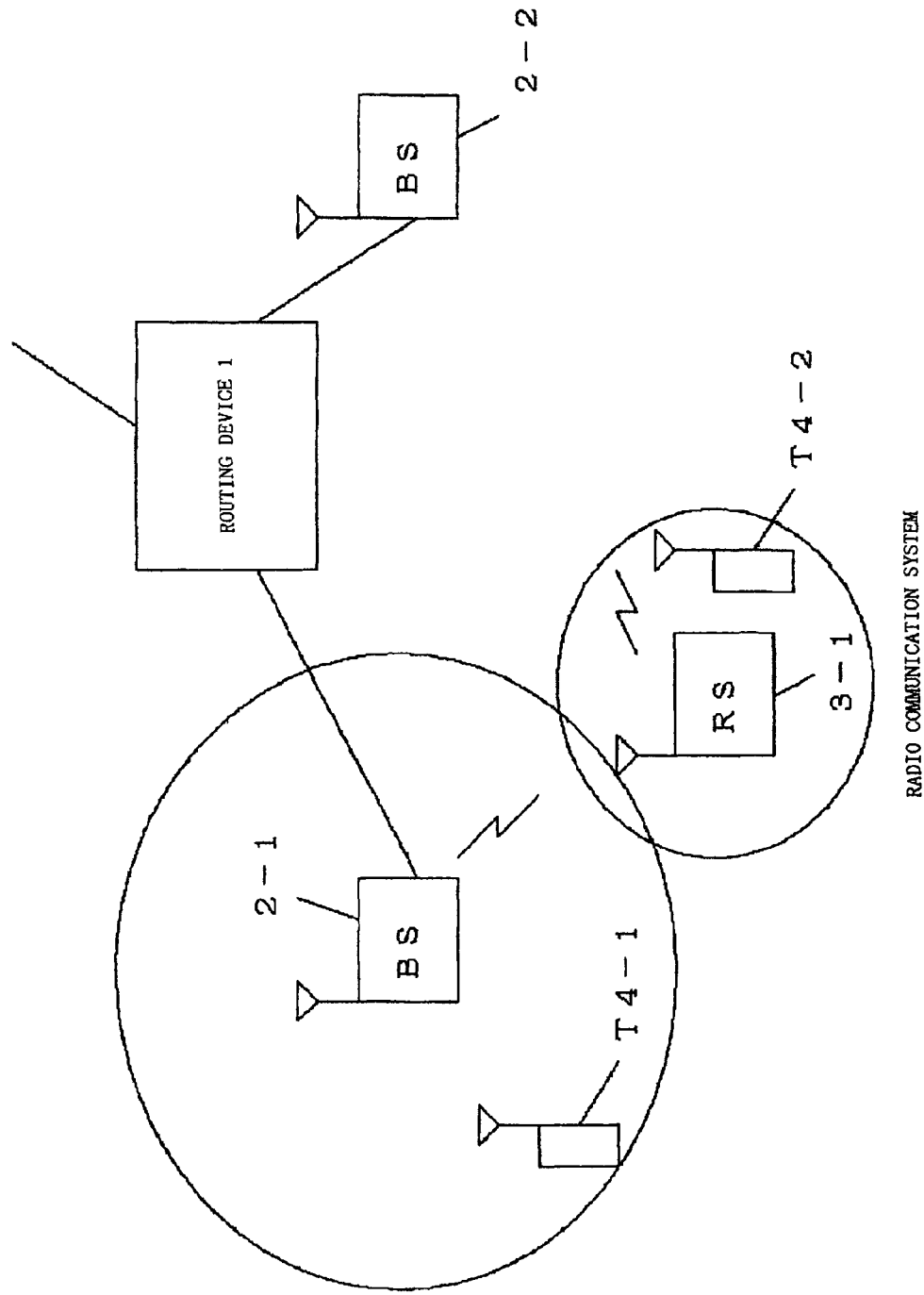
FIG. 1 is an exemplary illustration of a radio communication system.

A preferred embodiment of the present invention will be explained below.

[a] First Embodiment

A radio communication apparatus (relay station, radio terminal) for making radio communication with a radio base station is required to be synchronized with a radio frame transmitted from the radio base station. Therefore, each radio base station transmits a signal (synchronization signal) for synchronization with the radio frame. The synchronization signal may be set as preamble signal which is different in each radio base station and the radio communication apparatuses previously store patterns of preamble signals of a plurality of kinds and therefore it is capable of selecting the highest quality pattern (for example, highest receiving level) among the stored patterns as a radio base station as the communication partner.

When the OFDM (OFDMA), for example, is used as the radio system, a radio base station assigns transmitting data to each sub-carrier for transmission with use of a plurality of sub-carriers. In such case, the radio base station can transmit the preamble by assigning the preamble to each sub-carrier in the predetermined patterns. Then the radio terminal synchronizes with a radio base station from which the radio terminal receives a preamble with the highest quality (the best matching condition).

In addition, the radio base station transmits a signal in a frame format with reference to the synchronization signal. A radio communication apparatus establishes frame synchronization by using the synchronization signal and receives a mapping information (data to control transmitting or receiving operation of a radio communication apparatus: MAP data) of data with reference to the synchronization signal. For example, the MAP data is allocated right after the synchronization signal.

The MAP data is allowed to include timing, channel information or the like for mapping data to a physical channel (downlink channel (channel to the radio communication apparatus side from the radio base station) and uplink channel (channel to the radio base station side from the radio communication apparatus side)). Moreover, the radio frame has a format corresponding to the MAP data. Moreover, the physical channel can be designated to each radio communication apparatus with designation of the radio communication apparatus by using the identifying information thereof. It is of course possible that the mapping information is transmitted to a plurality of radio communication apparatuses (for example, all radio communication apparatuses in the service area formed by the radio base station) without particular designation of a radio communication apparatus.

Accordingly, data formed with inclusion of parameter required for reception (transmission) of reception (transmission) timing and receiving (transmitting) channel (receiving (transmitting) sub-channel pattern information) or the like and a corresponding terminal ID may be used as an example of the MAP data.

A radio terminal within the service area of a radio base station receives directly (rather than via a relay station) the synchronization signal from the radio base station to establish synchronization. The radio terminal directly receives MAP data with reference to the synchronization signal, also receives radio signals in a reception timing via a receiving channel designated by the MAP dada, and transmits radio signals in a transmission timing via a transmitting channel designated by the MAP data. Accordingly, radio communication can be made with the radio base station directly (rather than via the relay station).

On the other hand, the relay station also receives the synchronization signal from the radio base station and establishes synchronization. With reference to the synchronization signal, the relay station receives the MAP signal and makes radio communication (via the MMR link) with a radio base station in transmission timings and a reception timings designated by the MAP data.

When a radio terminal is located within the service area of the relay station, although outside of the service area of the radio base station, the relay station receives data since the data addressed to the radio terminal is transmitted to the relay station via an MMR link. The relay station transmits a preamble and MAP data and also transmits data to the radio terminal in a timing notified to the radio terminal with the MAP data. In the same manner, a transmission timing of uplink data is notified to the radio terminal by using the MAP data, user data or the like transmitted from the radio terminal is received in accordance with such notification, and such user data is transmitted to the radio base station 2 via the MMR link in accordance with the MAP data transmitted from the radio base station. Since the MMR link used as the communication link between the radio base station and the relay station, radio terminals are not required to receive signals transmitted via the MMR link.

As explained above, the relay station is required to make radio communications with both the radio base station and radio terminals under the control of the relay station.

Here, in the case where frequencies used for radio communication between the relay station and the radio base station are equal to or near frequencies used for radio communication between the relay station and radio terminals, the relay station probably cannot receive, in some cases, normal radio signals from the radio base station due to diffusion of transmitting signals from the relay station to the radio terminals under the control thereof on the occasion of receiving the radio signals from the radio base station. Moreover, when the relay station receives radio signals from the radio terminals under the control thereof, it cannot likely receive radio signals normally from the radio terminals under the control thereof because transmitting signals to the radio base station from the relay station diffuses to the reception processing device.

Therefore, a receiving period in which the relay station receives radio signals from the radio base station is deviated not to overlap from a transmitting period in which the relay station transmits radio signals to radio terminals.

Moreover, a transmitting period in which the relay station transmits radio signals to the radio base station is deviated not to overlap from a receiving period in which the relay station receives radio signals from the radio terminals.

Next, coordination between radio communications between the relay station and the radio base station and radio communication between the relay station and the radio terminals will be explained with reference to the accompanying drawings.

Detail structure and operation of each unit will be explained below with reference to the drawings.

FIG. 1 shows a structure of a radio communication system in a first embodiment. In FIG. 1, numeral 1 denotes a routing device; 2, a radio base station (BS); 3, a relay station (RS); 4, a radio terminal (T), respectively. As the radio terminal 4, a so-called MS (Mobile Station) suitable for moving use or a radio apparatus suitable for stationary use may be used.

Here, the radio terminal 4 is capable of making radio communication directly (rather than via a relay station) with the radio base station 2 within the service area thereof and is also capable of making radio communication via the relay station 3 with the radio base station 2 within the service area of the relay station 3. In the area assuring communication with the radio base station 2 (within the service area of the radio base station 2 or the area outside of the service area thereof), one or more relay stations 3 may be provided for radio communication with the radio terminal 4. However, under the situation illustrated in the figure, the radio terminal 4-1 is capable of making radio communication directly with a radio base station 2-1, but a radio terminal 4-2 cannot make radio communication directly with the radio base station 2-1 and makes communication with the radio base station 2-1 via the relay station 3-1.

In the case where the relay station 3 is provided within the service area of the radio base station 2, it is desirable that directivity of an antenna for communication with the radio terminal 4-2 is formed in the direction outside of the service area of the radio base station 2 (direction of the radio terminal 4-2) for communication with the radio terminal 4 outside of the service area of the radio base station 2.

Moreover, the relay station 3 is provided in the area outside the service area of the radio base station 2, it is requested to still maintain the MMR link. For example, the MMR link can be maintained even if the relay station 3 is located in the area outside of the service area thereof by controlling transmission power of signals which are necessary to form the MMR greater than transmission power of other signals to enable transmission of the signals which are necessary to form the MMR outside the service area or by enhancing receiving sensitivity of the relay station 3 (by utilizing a reception processing device having higher sensitivity, providing an antenna having higher gain, or using an antenna having excellent directivity to send a beam to the radio base station 2).

The radio base station 2 is connected with the routing device 1. The radio base station 2 receives data from the radio terminal 4 and transmits data to the routing device 1 and also executes control of transmission of data received from the routing device 1 to the radio terminal 4. The routing device 1 is connected with a plurality of radio base stations for conducting routing to deliver data to a destination (communication partner) by transmitting the data received from the radio base station 2 to the other routing device or the other radio base station. Preferably, the radio base station 2 transfers the data to the routing device after conversion to a packet format. Here, it is desirable for the routing device 1 to provide a database which stores location registration areas of radio terminals (for example area information in which the radio terminal now exists, wherein the area may be formed by a plurality of service areas of radio base stations) and/or a service type of each radio terminal and the routing device 1 can acquire such data from this database as required at the time of routing process.

Next, a structure of the radio base station 2 will be explained in more detail with reference to FIG. 2.

Figure 2:
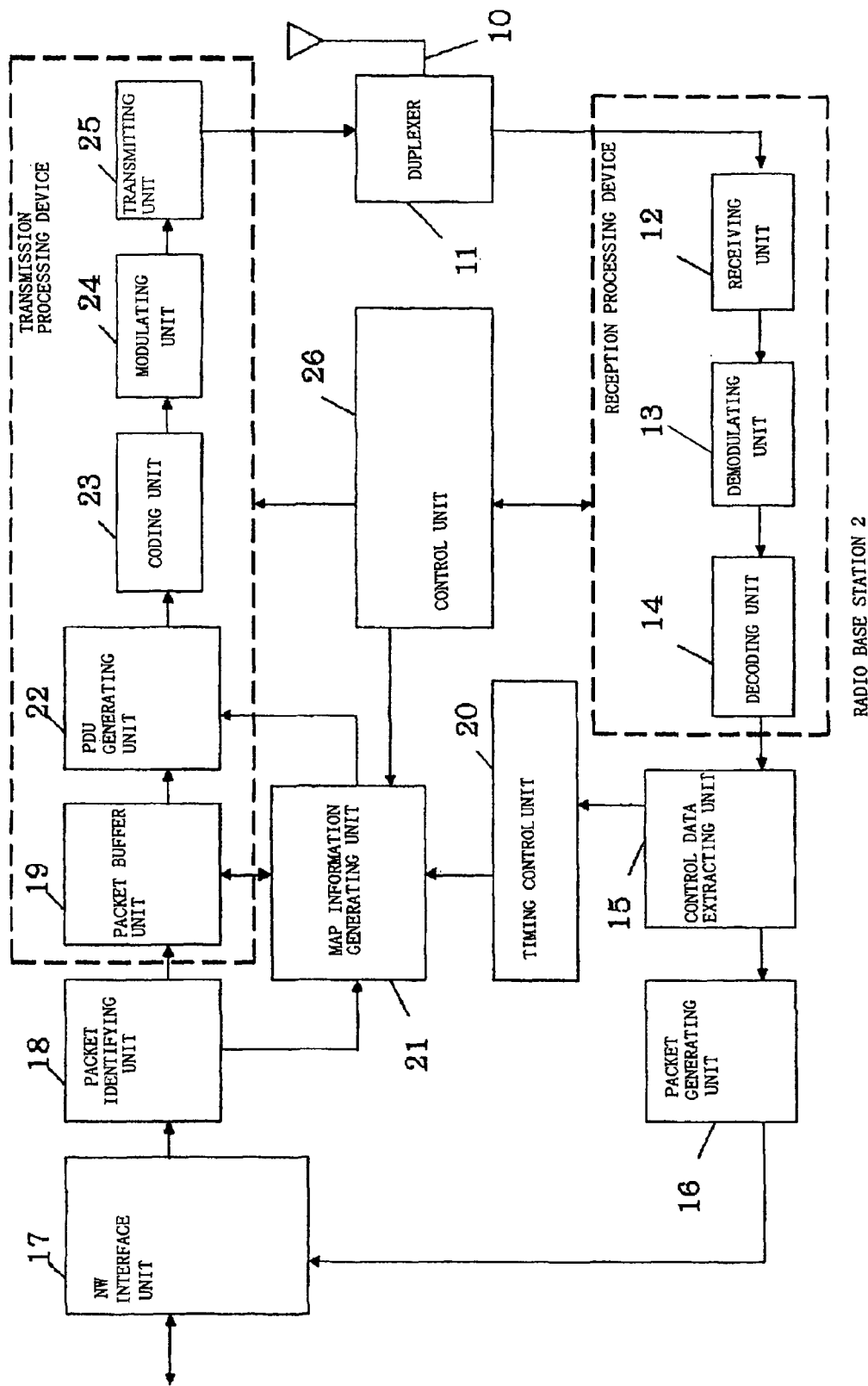
FIG. 2 is an exemplary illustration of a radio base station 2.

FIG. 2 is a diagram showing a structure of the radio base station 2.

In FIG. 2, numeral 10 denotes an antenna for transmitting and receiving radio signals with the relay station 3 and radio terminal 4; 11, a duplexer using in common the antenna 10 in the transmitting and receiving systems; 12, a receiving unit; 13, a demodulating unit for demodulating the receiving radio signals; 14, a decoding unit for decoding the demodulated received signals; 15, a control data extracting unit for extracting control data from the decoding data to give the control data to a timing control unit 20 and also transferring the other data such as user data or the like to a packet generating unit 16; 16, the packet generating unit for transferring the data transferred from the control data extracting unit to an NW interface unit as the packet data.

Numeral 17 denotes an interface unit to form an interface (here, packet communication is conducted) to the routing device 1; 18, a packet identifying unit for identifying an IP address included in the packet data received from the NW interface unit 17, determining a radio terminal as the communication partner based on the IP address data (for example, the ID of the corresponding radio terminal 4 is acquired by storing correspondence between the IP address data and the ID of the radio terminal 4), acquiring the QOS (stored corresponding to the ID) corresponding to the ID, issuing request for band assignment by giving the ID, QOS information to a MAP information generating unit 21, and storing packet data transferred from the NW interface unit 17 to a packet buffer unit 19.

Numeral 20 denotes a timing control unit to generate a control signal for timing control of radio communication between the relay station 3 and the radio terminal 4 (4-2). Namely, the timing control unit 20 transmits the timing control signal to the relay station 3-1 via the MMR link by generating the timing control signal and applying the timing control signal to a MAP information generating unit 21.

Numeral 21 denotes the MAP information generating unit to determine a mapping area corresponding to QOS by using the ID of the radio terminal 4 as a key and instruct a PDU generating unit 22 to form a frame format in accordance with such mapping area. In this case, the MAP information generating unit 21 reads data to be transmitted from the packet buffer unit 19 and transfers the data to the PDU generating unit 22 together with the MAP data.

The MAP information generating unit 21 administrates and stores where the radio terminal 4 is located. In case where the radio terminal (for example, T4-1) exists in a service area of the radio base station, the MAP information generating unit stores that the radio terminal 4 is in the service area of the radio base station. While in case where the radio terminal 4 is located under the control of the relay station (for example, T4-2), the MAP information generating unit stores that the radio terminal exists in the service area of the relay station (RS3-1). When the radio terminal 4 is located within the service area of the base station, the MAP information generating unit 21 generates MAP data for direct transmission. When the radio terminal 4 is located under the control of the relay station (in a service area of the relay station), the MAP information generating unit 21 generates MAP data for transmitting data addressed to the radio terminal 4 to the relay station via the MMR link.

Numeral 22 denotes the PDU generating unit to generate the PDU to store the MAP data and transmitting data or the like to each region of the radio frame formed with reference to the synchronization signal (preamble) and also transmits the PDU to a coding unit 23. Numeral 23 denotes the coding unit; 24, a modulating unit; 25, a transmitting unit respectively. The PDU data is modulated after the encoding process such as error-correcting coding and the modulated PDU data is transmitted as radio signals via the antenna 10 from the transmitting unit 25.

Numeral 26 denotes a control unit to control the transmission and reception timings of the radio base station 2 by respectively controlling the MAP information generating unit 21, transmission processing device, and reception processing device or the like.

Figure 3:
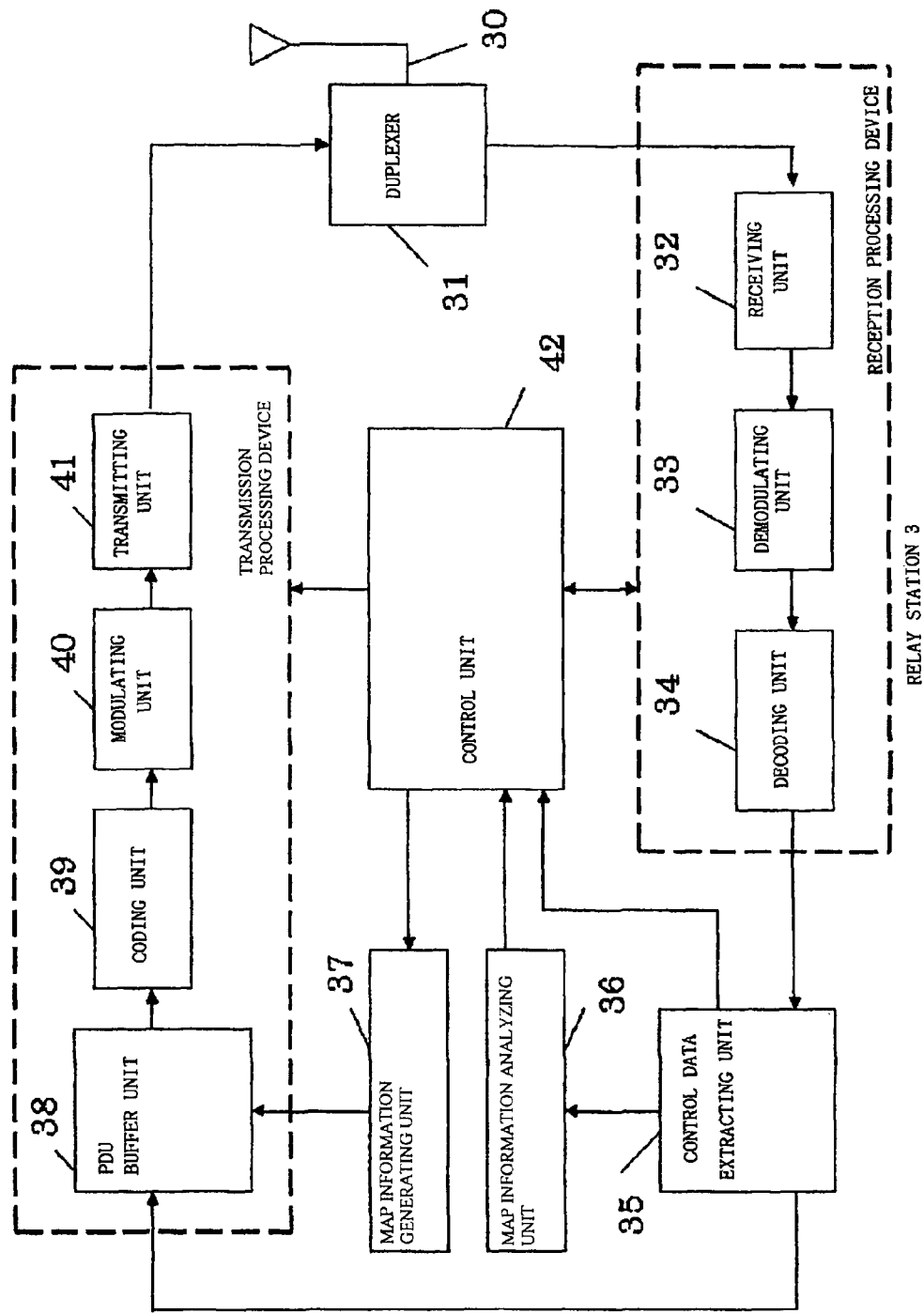
FIG. 3 is an exemplary illustration of a relay station 3.

FIG. 3 is a diagram showing a structure of the relay station 3.

In FIG. 3, numeral 30 denotes an antenna for transmitting and receiving radio signals with the radio base station 2 and the radio terminal 4 (for example T4-2); 31, a duplexer for using in common the antenna 10 for transmission and reception; 32, a receiving unit; 33, a demodulating unit for demodulating the received signal; 34, a decoding unit for decoding the demodulated received signals; 35, a control data extracting unit 35, for extracting the MAP data (received from the radio base station 2) from the decoded data and giving the MAP data to a MAP information analyzing unit 36 and for transferring data addressed to the radio terminal 4 received from the radio base station 2 to a PDU unit 38. In the case where radio signals are received from the radio terminal 4, the receiving data is also transferred to the PDU buffer unit 38 for transmission to the radio base station 2.

Numeral 36 denotes the MAP information analyzing unit to interpret the MAP data and to apply the transmission and reception timings to the control unit 42 to form the MMR link for the radio base station 2.

Numeral 37 denotes a MAP information generating unit to generate the MAP data for designating communication timing and channel for the radio terminal (for example, 4-2) under the control and also to apply the MAP data to the PDU buffer unit 38.

Numeral 38 denotes a PDU buffer unit to add a preamble as the leading area of a frame and applies the data to a coding unit 39 to transmit the MAP data received from the MAP information generating unit 37 and transmitting data to the radio terminal 4 under the control in the transmission timing designated by the MAP data.

Numeral 39 denotes the coding unit; 40, a modulating unit respectively. The transmitting data from the PDU buffer unit 37 is transferred to a transmitting unit 41 after the encoding and the modulation process.

Numeral 41 denotes a transmitting unit to transmit the transmitting radio signals to the radio terminal 4 under the control and the radio base station 2 via the antenna 30.

Numeral 42 denotes a control unit to control transmission timing, transmitting channel, reception timing and receiving channel by controlling the transmission processing device and the reception processing device. This control unit generates, if necessary as the control data, a switching time between transmission and reception and an offset time until transmission of the synchronization signal (preamble) to the radio terminal 4 under the control of the relay station 3-1 from reception of the synchronization signal (preamble) from the radio base station 2. The control data generated is transferred, in accordance with the result of analysis in the MAP information analyzing unit 36, to the radio base station 2 via the uplink channel of the MMR link.

Figure 4:
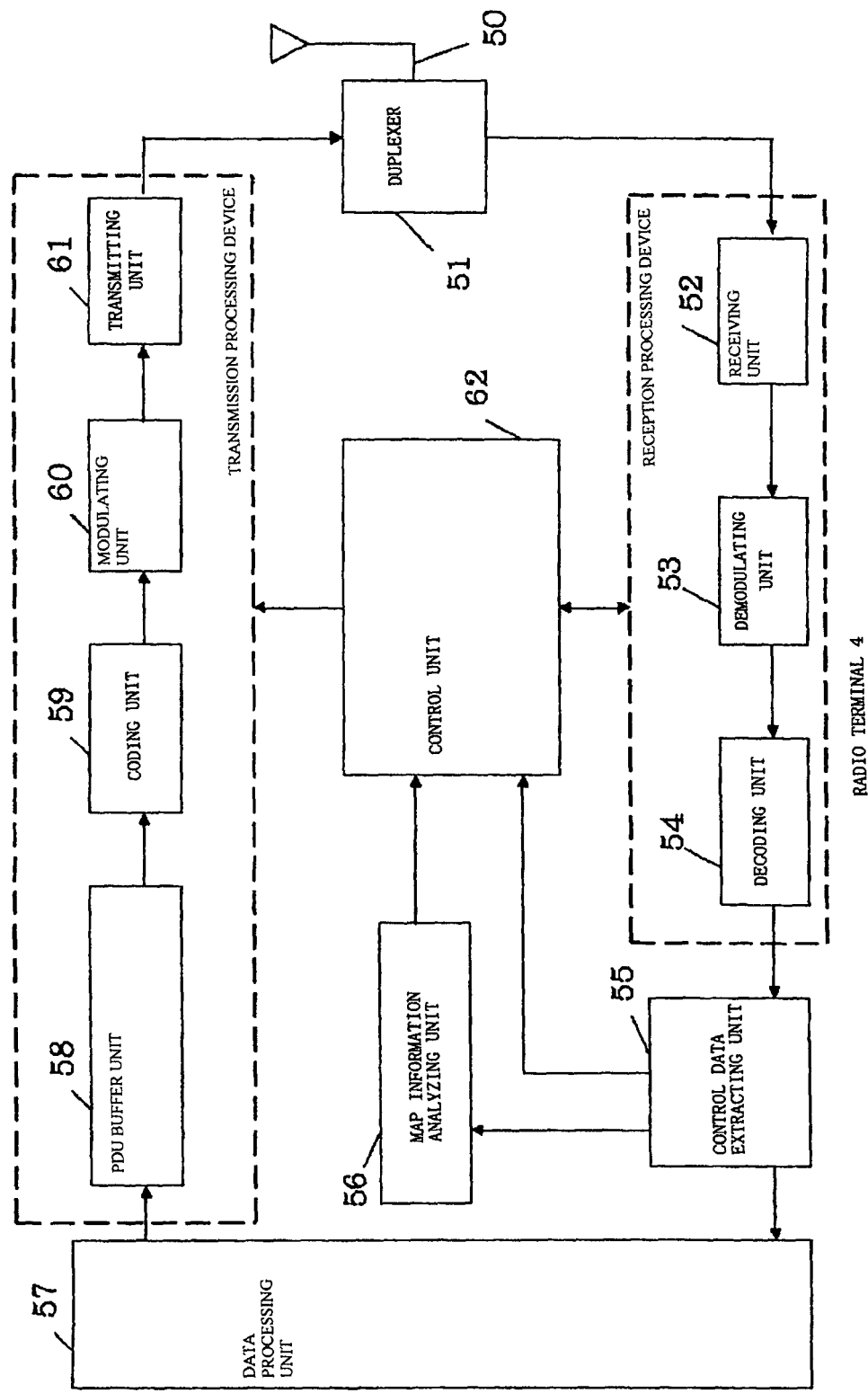
FIG. 4 is an exemplary illustration of a radio terminal 4.

FIG. 4 is a diagram showing a structure of the radio terminal 4.

In FIG. 4, numeral 50 denotes an antenna for transmitting and receiving radio signals with the relay station 3 and the radio base station; 51, a duplexer for using in common the antenna 50 for transmission and reception; 52, a receiving unit; 53, a demodulating unit for demodulating the received signals; 54, a decoding unit for decoding the demodulated received signals; 55, a control data extracting unit for extracting the control data from the decoding data, applying the MAP data when it is detected to the MAP information analyzing unit 56 and transferring the other data (user data) to a data processing unit 57.

The MAP information analyzing unit 56 interprets the MAP data received from a relay station 3 (or a radio base station), detects the transmission and reception timings, and transmitting and receiving channels for communication with the relay station 3 (or the radio base station), and applies the result of detection to the control unit 62.

Numeral 57 denotes the data processing unit to execute display process and audio output process of various data included in the receiving data.

Moreover, user data to be transmitted to the apparatus of the communication partner from the data processing unit 57 is then inputted to a PDU buffer unit 58.

Numeral 58 denotes the PDU buffer unit to control a coding unit 59 and a modulating unit 60 for transmission in the transmission timing with transmitting channel designated with the MAP data by controlling the transmitting data from the data processing unit 57 with the control unit 62.

Numeral 59 denotes a coding unit; 60, a modulating unit. The transmitting data is subjected to the coding and modulating processes to transmit the transmitting data from the PDU buffer unit 58 in the transmission timing with the transmitting channel designated by the MAP data.

A transmitting unit 61 transmits radio signals via the antenna 50.

Numeral 62 denotes a control unit to control the transmission/reception timings and transmitting/receiving channels in the transmission processing device and the reception processing device on the basis of the result of analysis of the MAP data. Moreover, this control unit 62 adjusts the transmission and reception timings in accordance with a compensation value when the control data extracting unit 55 extracts a timing compensation signal from the radio base station 2 and the relay station 3.

Next, an example of a radio frame format will be presented and a communication sequence in the system explained above will be explained below in detail. Here, the radio frame format conforming to the IEEE Std802.16 d, e will be considered as an example but the present invention is not limited thereto.

Figure 5:
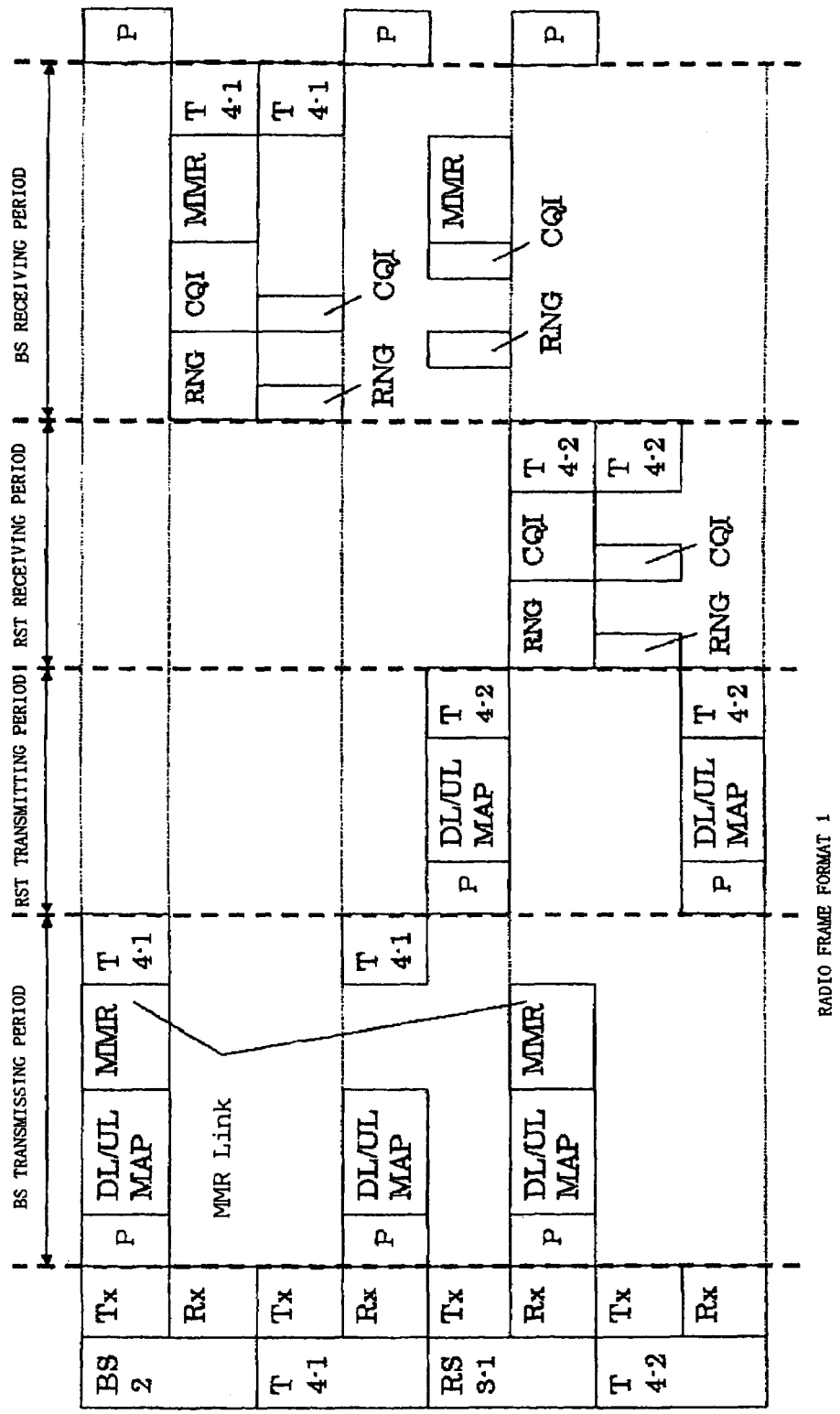
FIG. 5 is an exemplary illustration of a radio frame format 1.

FIG. 5 shows an example of a frame format of the radio signals transmitted and received among the radio base station, relay station, and radio terminal. BS2-1, T4-1, RS3-1, and T4-2 are in the relationship of allocation shown in FIG. 1.

In FIG. 5, Tx, Rx respectively indicate transmission and reception. Therefore, the radio base station 2 transmits first the preamble (P) as the leading area, followed by sequential transmission of DL/UL MAP, MMR data. The preamble is formed in a known pattern to be transmitted for enabling synchronization of the radio terminal 4-1 and relay station 3-1 with the radio base station 2. When the OFDM (OFDMA) is used, the signal of the predetermined pattern is transmitted via each sub-channel.

Transmission of the preamble is followed by DL/UL MAP which is the region to store control data (MAP data) for sending the transmission/reception timings and transmitting/receiving channels to the relay station 3-1 and radio terminal 4-1. For example, in this region, the transmission timing and transmitting channel information of MMR data transmitted as the MMR link to the relay station with the downlink channel from the radio base station, the timing and transmitting channel information for data transmission (T4-1) to the radio terminal 4-1, and the MAP data (information indicating the mapping method for transmission or reception) as the information indicating with which timing and channel the data (MMR1, T4-1) should be transmitted via the uplink channel are included.

Therefore, each relay station 3 and radio terminal 4-1 are synchronized with the frame timing of the radio base station 2 by directly receiving the preamble P from the radio base station 2 and execute transmission and reception in the corresponding timing with the corresponding channel by receiving the DL/UL MAP with reference to such frame timing and determining the timing and channel for transmission and reception.

In the example of FIG. 5, the radio terminal 4-1 is synchronized with the radio base station 2 with the preamble transmitted from the radio base station 2 and analyzes DL/UL MAP. Thereby, it recognizes that the data is transmitted in the timing (T4-1) and channel designated and therefore it operates to receive such data (T4-1).

Moreover, RS3-1 analyzes the DL/UL MAP to receive the MMR including a message to the own station. This MMR includes data to be transmitted to the radio terminal 4-2 (here, data to be transmitted to T4-2).

Meanwhile, the relay station 3-1 sequentially transmits, like the radio base station 2, DL/UL MAP starting from a preamble (P) of a frame as the leading area. The preamble is a predetermined known pattern transmitted for enabling synchronization of the radio terminal 4-2 with the relay station 3-1. When the OFDM (OFDMA) is used, the signal of the predetermined pattern is transmitted via each sub-channel.

The data of T4-2 is transmitted in the timing with channel designated in the radio terminal 4-2 by the MAP data.

The radio terminal 4-2 is synchronized with the relay station 3-1 by receiving the preamble transmitted from the relay station 3-1 and analyzes the DL/UL MAP. Thereby, it recognizes that the data is transmitted in a timing (T4-2) with a channel designated by the DL/UL MAP and therefore it operates to receive the data (T4-2).

Moreover, the radio terminal 4-2 transmits RNG (ranging signal), CQI (reception quality information) and data (user data or the like) in the timing allowed for transmission with the UL MAP.

RNG indicates a ranging signal transmitted from the radio terminal 4 and relay station 3-1 as a known signal. In the reception processing devices of the relay station 3 and radio base station 2 having directly received the ranging signal, deviation of reception timing (phase shift), deviation of receiving frequency and increment/decrement information of the required transmitting power are acquired and these information pieces are reported to the transmitting source of the ranging signal as an adjustment information. The RNG signal from the radio terminal 4-2 is received by the relay station 3-1 in the timing with channel designated by the MAP data from the relay station 3-1 and is then transmitted to the radio base station 2 via the MMR link. Moreover, CQI is a signal for reporting the result of measurement of the reception quality of the known signal such as preamble or the like and the transmission timing and transmitting channel thereof are respectively defined with the UL MAP or the like from the radio base station 2 and relay station 3-1. The transferring route of the signal is similar to that of the RNG signal. The relay station 3-1 transmits the RNG (ranging message), CQI (reception quality information), and data (user data or the like) received to the radio base station 2 via the MMR link.

In the frame format example explained above, the receiving period in which the relay station 3 receives radio signals from the radio base station 2 is not overlapped through deviation from the transmitting period in which the relay station 3 transmits radio signals to the radio terminal 4. Moreover, the transmitting period where the relay station 3 transmits radio signals to the radio base station 2 is not overlapped through deviation from the receiving period in which the relay station 3 receives radio signals from the radio terminal 4.

Moreover, the transmitting period (BS transmitting period) in which the radio base station 2 transmits radio signals, the transmitting period (RST transmitting period) in which the relay station 3-1 transmits radio signals to the radio terminal 4 (including 4-2), the receiving period (RST receiving period) in which the relay station 3-1 receives radio signals from the radio terminal 4 (including 4-2), and the receiving period (BS receiving period) in which the radio base station 2 receives radio signals are allocated in this sequence without overlap on the time axis.

Accordingly, the relay station 3 can prevent, on the occasion of receiving radio signals from the radio base station 2, that transmitting signal from the relay station 3 to a radio terminal 4 under the control of the relay station 3 diffuses into the reception processing device and thereby radio signals from the radio base station 2 cannot be received normally by the relay station 3. Moreover, the relay station 3 can also prevent, on the occasion of receiving radio signals from the radio terminal 4 under the control thereof, that transmitting signals from the relay station 3 to the radio base station 2 diffuses into the reception processing device and thereby radio signals from the radio terminal 4 under the control thereof cannot be received normally by the relay station.

Note that an adjustment of the transmission and reception timings is controlled with the control units 26, 42, and 62 in each device.

Next, another example of the radio frame format will be presented.

Figure 6:
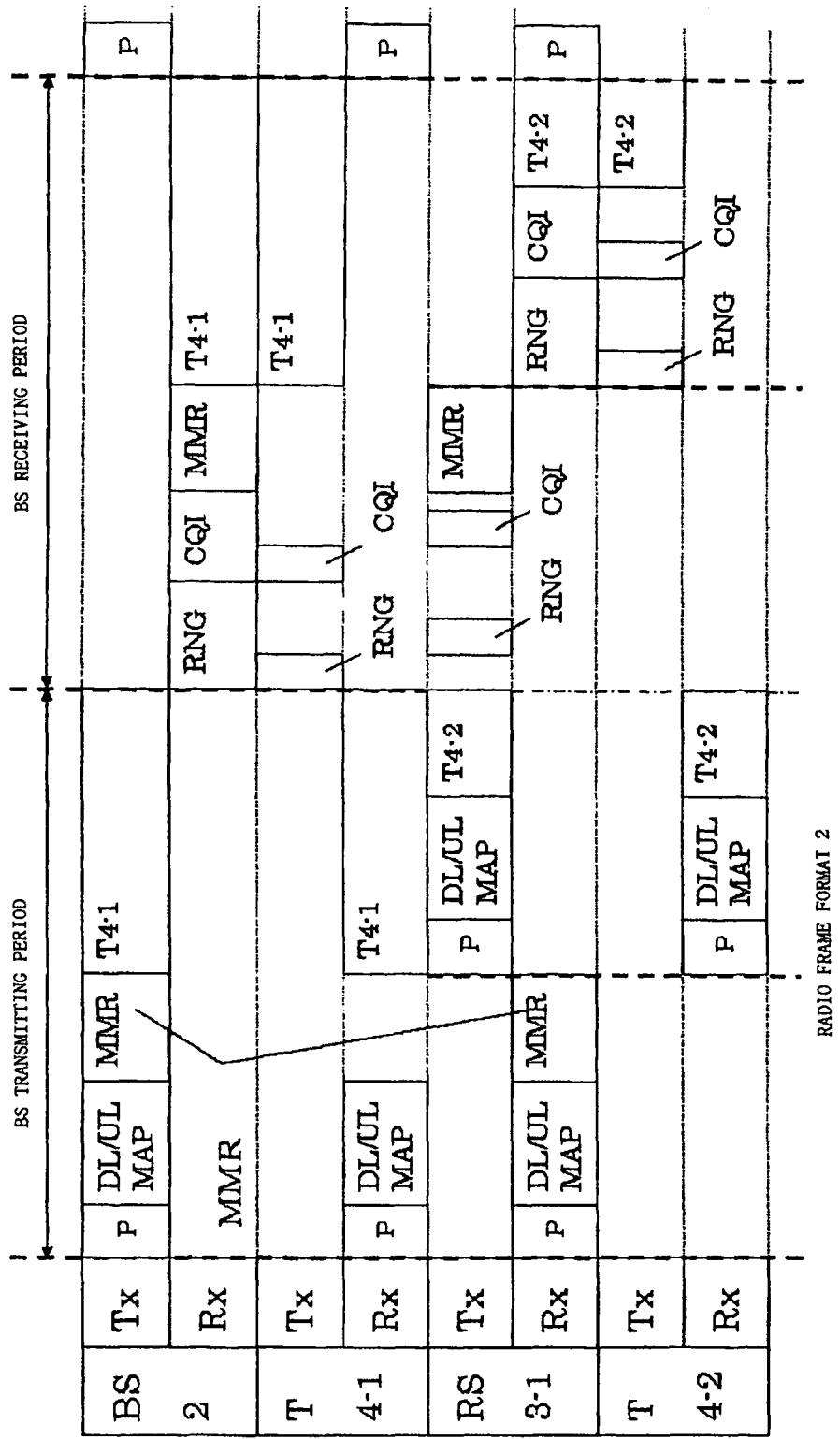
FIG. 6 is an exemplary illustration of a radio frame format 2.

FIG. 6 is a diagram showing an example of a frame format of radio signals transmitted and received among the radio base station, relay station, and radio terminal.

Even in this example, the receiving period in which the relay station 3 receives radio signals from the radio base station 2 is not overlapped through deviation from the transmitting period in which the relay station 3 transmits radio signals to the radio terminal 4. Moreover, the transmitting period in which the relay station 3 transmits radio signals to the radio base station 2 is not overlapped through deviation from the receiving period in which the relay station 3 receives radio signals from the radio terminal 4.

However, in this example, the relay station 3-1 transmits radio signals to the radio terminal 4 (including 4-2) under the control thereof within the transmitting period of the radio base station 2 (within the receiving period of the radio terminal (for example, 4-1) under the control within the service area of the radio base station 2). In FIG. 6, the receiving period of the radio terminal 4-1 within the service area of the radio base station 2 (transmitting period to the radio terminal 4-1 from the radio base station 2) is matched with the period in which the relay station 3-1 is transmitting radio signals to the radio terminal 4 (including 4-2) under the control thereof, but this matching is not always required (can be not matched).

Moreover, in the example of FIG. 5, the relay station 3-1 transmits radio signals to the radio terminal 4 (-2) under the control thereof and thereafter this relay station receives radio signals from the radio terminal (-2) under the control thereof. However, in the case of the example of FIG. 6, the relay station 3-1 transmits radio signals to the radio terminal 4 (-2)

under the control thereof and thereafter the relay station 3-1 transmits the radio signal to the radio base station 2.

In the case where transmission of RNG to MMR is set after transmission of T4-2, it is desirable to change the transmission sequence in the manner that reception of the RNG to T4-2 from the radio terminal 4-2 follows the transmissions of the RNG to MMR from the relay station 3-1.

Moreover, in this example, transmission from the radio terminal 4-2 (the relay station 3-1 receives) is conducted within a receiving period of the radio base station 2 (receiving period of user data from the radio terminal 4-1 under the control).

As explained above, application efficiency of radio channels can be improved by providing the RS transmitting period within the BS transmitting period and by providing the RS receiving period within the BS receiving period.

Adjustment of the transmission and reception timings is controlled by the control units 26, 42, and 62 in each device.

Next, the transmission and reception timings among the radio base station 2-1, relay station 3-1, and radio terminal 4-2 will be explained with reference to the detail diagram for explaining transmission and reception timings of FIG. 7.

Figure 7:
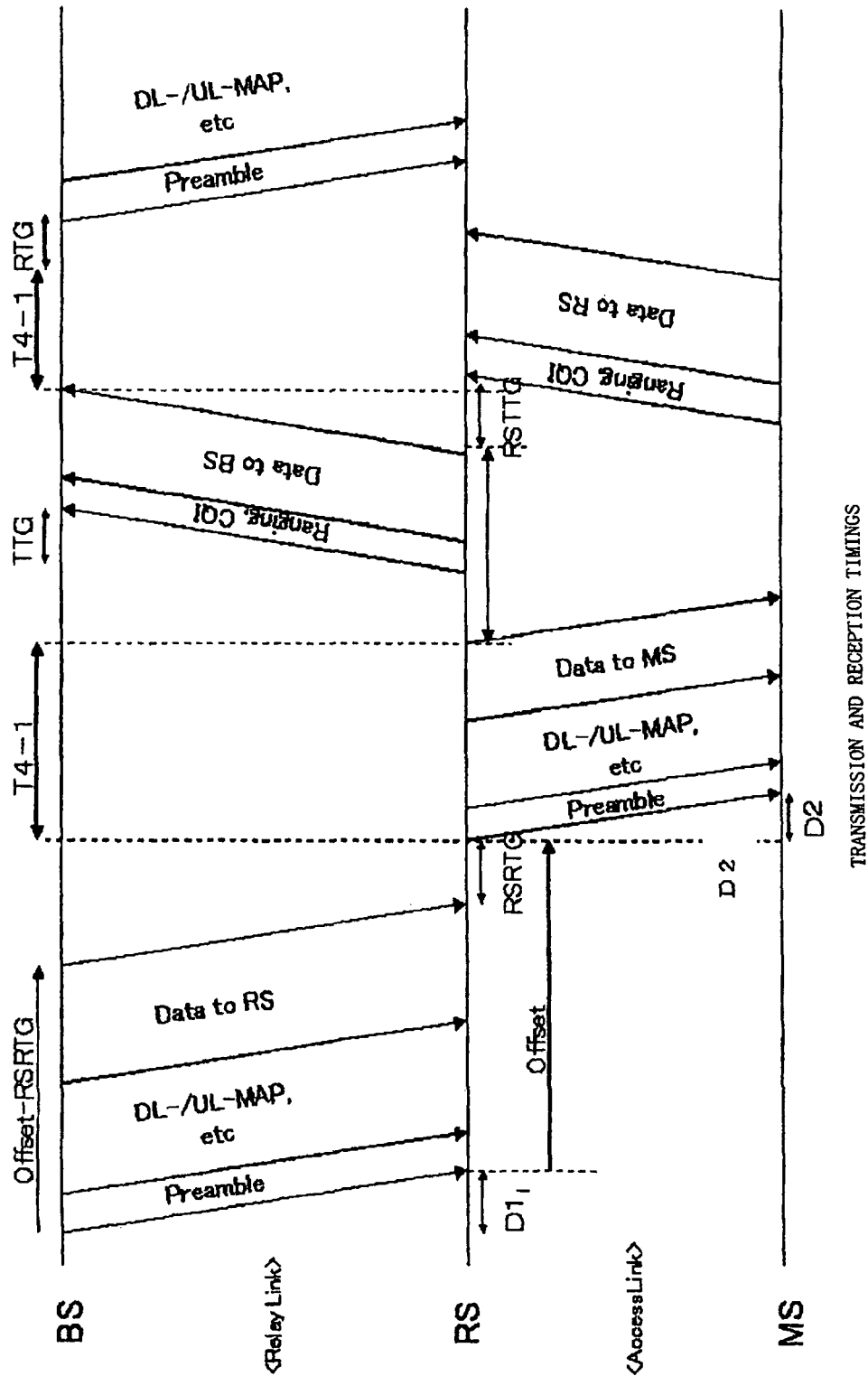
FIG. 7 is an exemplary illustration of a transmission and reception timings.

In FIG. 7, D1 indicates a delay time caused by the propagation time to the relay station 3-1 from the radio base station 2-1 and D2 indicates a delay time caused by the propagation time to the radio terminal 4-2 from the relay station 3-1.

Moreover, TTG indicates a switching time for switching the transmitting state to the receiving state in the radio base station 2, while RTG, a switching time for switching the receiving state to the transmitting state, RSRTG, a switching time for switching the receiving state to the transmitting state in the relay station 3, and RSTTG, a switching time for switching the transmitting state to the receiving state. In these switching times, actual transmission and reception are not required because the transmitting and receiving states are switched each other during these switching times.

The preamble transmitted from the transmission processing device of the radio base station 2-1 is received by the reception processing device of the relay station 3-1 with delay time D1. The relay station 3-1 receives the MMR data (data to RS in the figure) by analyzing the DL/UL MAP transmitted subsequently with the MAP information analyzing unit 36 with reference to the preamble in order to identify the reception timing and receiving channel.

The control unit 42 controls, upon detection of complete reception of the MMR or detection of elapse of the predetermined time with reference to the preamble received from the radio base station 2-1 (reception timing of preamble is given from the reception processing device), the transmission processing device to start transmission of the preamble. That is, the control unit 42 controls the MAP information generating unit 37 to generate the MAP data and to apply this MAP data to the PDU buffer unit 38 in view of transferring the preamble, MAP data and the transmitting data to the radio terminal to the coding unit 39 from the PDU buffer unit 38 and transmitting these data from the antenna through the modulating unit 40 and transmitting unit 41.

The control unit 42 of the relay station 3-1 can start, if the switching time between transmission state and reception state is not particularly required, transmission of preamble by switching the receiving state to the transmitting state after elapse of the offset time. When the switching time is required to switch between the transmission state and the reception state, the control unit 42 of the relay station 3-1 starts to switch the reception state to the transmitting state in a timing preceding the starting timing of transmission of the preamble by setting a time obtained by subtracting the RSRTG time from the offset time as the predetermined time.

Here, as the offset time, the time designated from the timing control unit 20 of the radio base station 2 via the MMR or the like or the time preset separately to the control unit 42 in the relay station 3 may be used.

Moreover, in the figure, the transmission processing device of the radio base station 2-1 does not transmit data after transmission for the MMR link but is capable of transmitting data to the radio terminal 4 (for example, 4-1) within the service area of the radio base station 2-1 within the period of T4-1 in the left side. However, this transmission is completed, in the radio base station 2-1, before the timing preceded by the TTG period from the timing to start reception from the relay station 3-1 under the control of the control unit 26.

On the other hand, the relay station 3-1 having started transmission of the preamble transmits, under the transmission control of the control unit 42, the DL/UL MAP and data to the radio terminal 4 (for example, data (T4-2) to the radio terminal 4-2) under the control thereof and completes such transmission before next start of transmission to the radio base station 2-1. Here, when a switching time is required to switch the transmission partner to the radio base station 2-1 from the radio terminal 4 under the control thereof, the control unit 42 controls the transmission processing device to quickly complete the transmission to the radio terminal 4 as much as such switching time.

When measurement of reception quality of the radio signal from the relay station 3-1 (for example, CINR (carrier to interference and noise ratio)) is necessary, such measurement is conducted in the reception processing device of the radio terminal 4-2 for the transmitting signal to a radio terminal 4 under the control of the relay station 3-1. The reception processing device of the relay station 3-1 measures reception quality for the preamble, DL/UL MAP data, and transmitting data to the radio terminal 4 (including radio terminal 4-2) under the control. Moreover, although not referred above particularly, different radio systems may be employed for the radio channel used for transmission and reception in the radio base station 2-1 and for the radio channel used between the relay station 3-1 and radio terminal 4-2. The radio system may include the method for assigning the pilot signal or subcarrier or PUSC (partial usage of sub-channel) or FUSC (full usage of sub-channels) or the like in the IEEE 802.16.

Upon completion of transmission of the ranging signal, CQI, data for the MMR link (data to BS) or the like to the radio base station 2, the control unit 42 of the relay station 3 controls the transmission processing device and the reception processing device to start switching to the receiving state from the transmitting state and to start reception of the ranging signal, CQI, and user data or the like from the radio terminal 4 (including radio terminal 4-2) under the control thereof after the RSTTG period.

The control unit 42 of the relay station 3-1 controls the reception processing device to switch the receiving source to the radio base station 2-1 to receive the next preamble transmitted from the radio base station 2-1.

The offset time can be minimized by adding the RSRTG period to the time required for transmission, by the radio base station 2, of data to be received by the relay station 3-1. Moreover, it is desirable here that the period of the radio frame (basic transmitting frame) allowing transmission of the DL/UL MAP data and MMR data from start of transmission of preamble by the radio base station 2-1 is set as the time required for transmission, by the radio base station 2, of the data to be received by the relay station 3-1.

In the case where the minimum offset time is not used, it is of course enough when the offset time is set in the manner that transmission of data to the radio terminal 4 from the relay station 3-1 is terminated before start of the next transmission of data to the radio base station 2 from the relay station 3-1.

Next, more suitable method for setting the offset time will be explained with reference to FIG. 8 and FIG. 9.

As explained previously, the relay station 3-1 starts transmission of preamble or the like to the radio terminal 4 under the control thereof and transmits. Upon completion of transmission of the data to the radio terminal 4, the relay station 3-1 starts to transmit the ranging signal, CQI, and MMR link data or the like by switching the transmission destination to the radio base station 2-1.

Therefore, in the case where the basic transmitting frame to the radio terminal 4 of the relay station 3-1 is continuously followed by the basic transmitting frame to the radio base station 2-1 of the relay station 3, it is desirable for the relay station 3-1 because adjustment of the transmission timing is no longer required when the transmission destination is switched.

The basic transmitting frame defines time duration for allowing transmission and therefore when the transmitting data is small in amount, transmission can be completed within a time shorter than the basic transmitting frame. However, it is not allowed to continue the transmission exceeding the basic transmitting frame.

Figure 8:
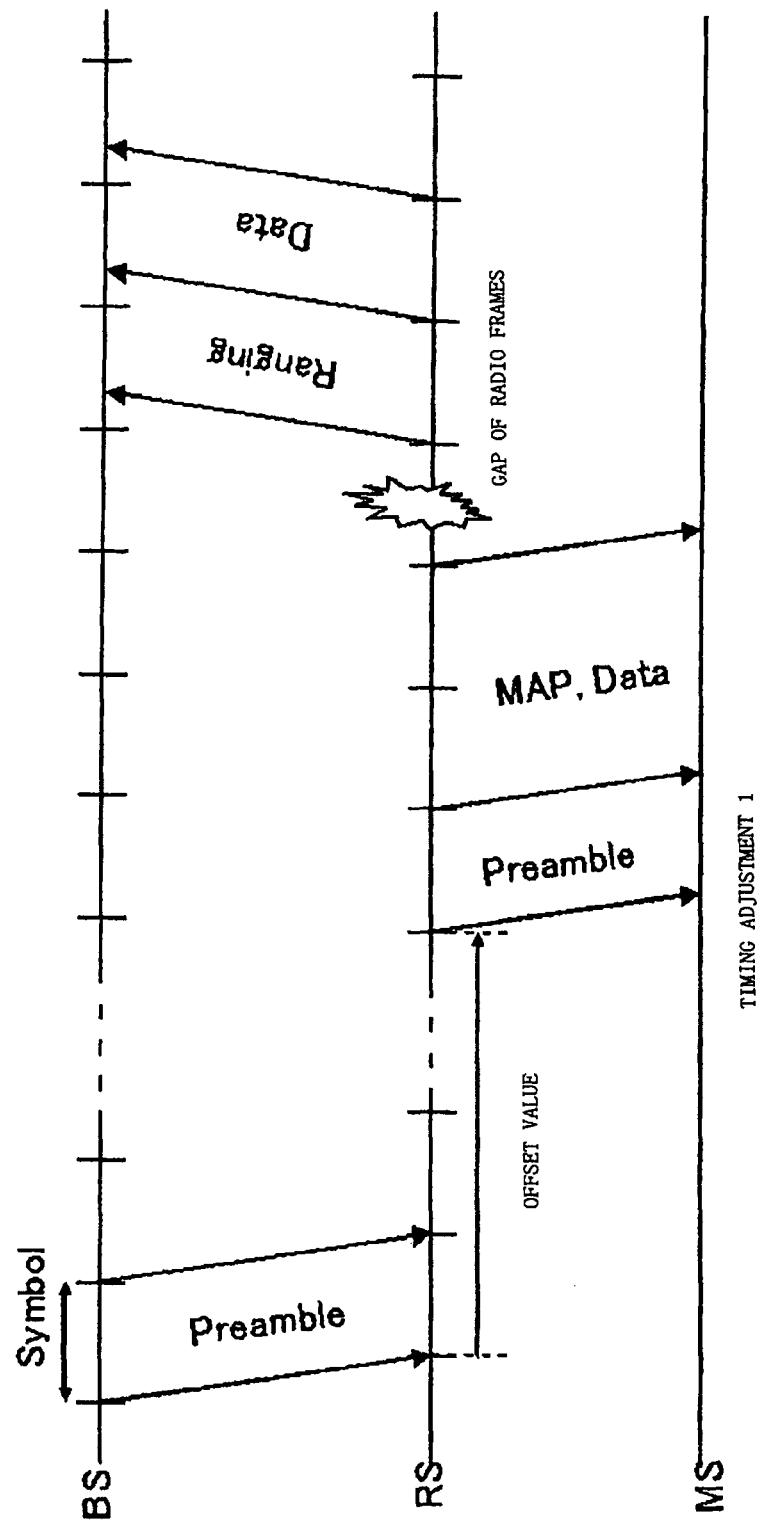
FIG. 8 is an exemplary illustration of a timing adjustment 1.

When the offset time is set without relation to the transmission timing to the radio base station 2-1 from the relay station 3-1, a gap of radio frame is generated, as shown in FIG. 8, between the basic transmitting frame to the radio terminal 4 of the relay station 3-1 and the basic transmitting frame to the radio base station 2-1 of the relay station 3-1.

Figure 9:
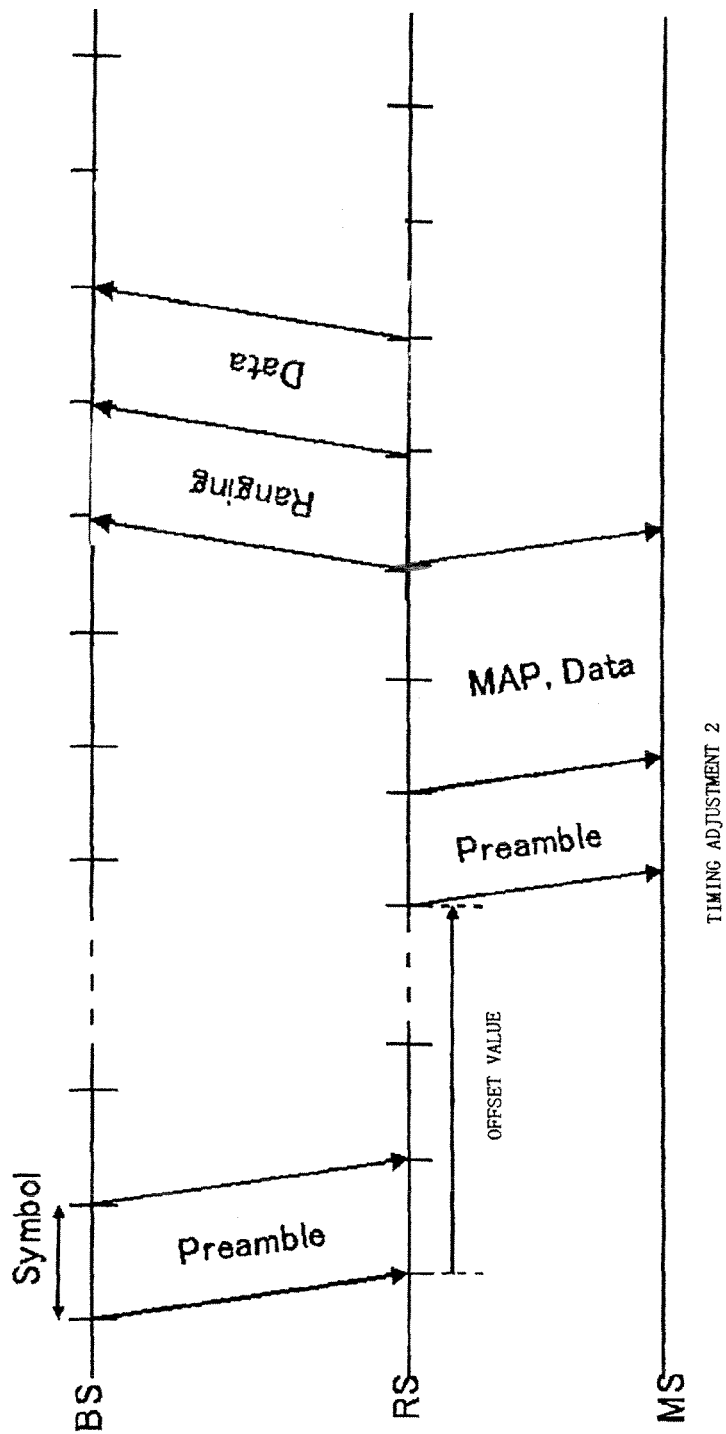
FIG. 9 is an exemplary illustration of a timing adjustment 2.

However, as shown in FIG. 9, smooth transmission can be realized by setting the offset value with reference to the basic transmitting frame to the radio base station 2-1 of the relay station 3-1, namely by setting the offset value in the manner that the basic transmitting frame to the radio base station 2-1 of the relay station 3-1 is continuously coupled to the basic transmitting frame to the radio terminal 4-2 of the relay station 3-1.

It is more desirable that the frequency (band) used by the relay station 3-1 for transmission to the radio terminal 4-2 is used in common with the frequency (band) used for transmission to the radio base station 2-1 in order to eliminate the switching process of frequency (band) in the transmitting state. For example, a first sub-carrier group belonging to a certain frequency (band) is used for transmission to the radio terminal 4-2 and a second sub-carrier group belonging to the same frequency (band) is used for transmission to the radio base station 2-1.

Therefore, in this case, the relay station 3-1 is capable of setting, as the offset time, the time obtained by subtracting the period of the basic transmitting frame to the radio terminal 4 (including 4-2) under the control thereof from the period until transmission of ranging signal to the radio base station 2-1 (leading area of the transmitting frame to the radio base station) from reception of preamble transmitted from the radio base station 2-1 (leading area of the receiving frame from the radio base station 2-1).

Here, it is desirable that the transmission start timing of the ranging signal from the relay station 3-1 is set to the transmission start timing adjusted as a result of instruction (a compensating signal is transmitted to the relay station 3-1 via the MMR) issued by the radio base station 2-1 to eliminate deviation of timings detected by the control unit 26 by comparing the timing of the radio frames with the receiving timing of the ranging signal transmitted from the relay station 3-1.

Figure 10:
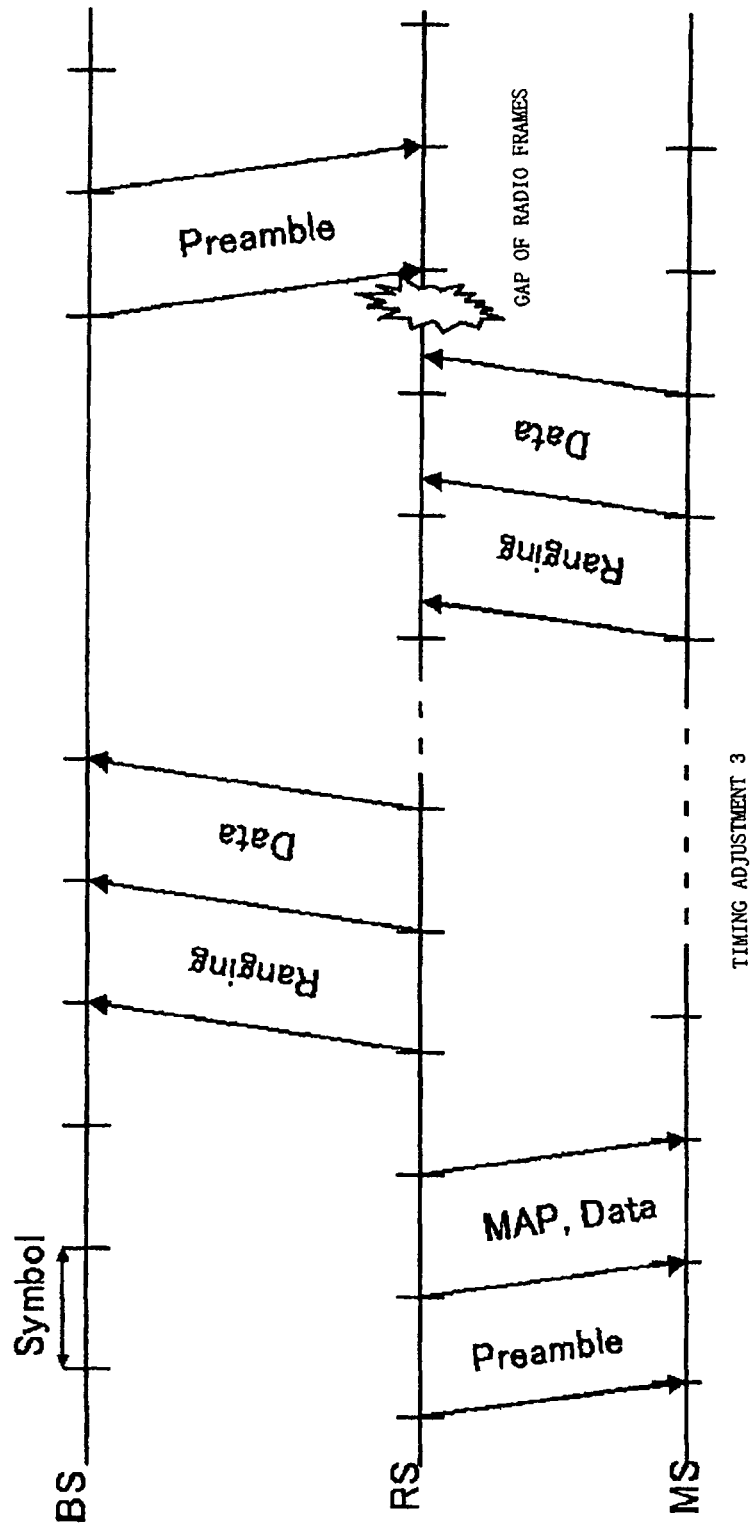
FIG. 10 is an exemplary illustration of a timing adjustment 3.

Next, adjustment of the transmission timing to the radio terminal 4 (4-2) of the relay station 3-1 will be explained with reference to FIG. 10 and FIG. 11.

The control unit 42 of the relay station 3-1 issues, upon completion of reception of the ranging signal and data or the like from the radio terminal 4 under the control thereof, a switching instruction to the reception processing device to receive again the preamble from the radio base station 2-1.

Therefore, it is desirable that the basic receiving frame from the radio terminal 4 of the relay station 3-1 is continued, without intermission, to the basic receiving frame from the radio base station 2-1 of the relay station 3-1, because adjustment of reception timing is no longer required for the relay station 3-1 when the receiving source is changed.

That is, when the basic receiving frame from the radio terminal 4(4-2) of the relay station 3-1 is set without relation to the basic receiving frame from the radio base station 2 of the relay station 3-1, a gap is generated in the radio frame as shown in FIG. 9.

However, smooth reception can be realized in the relay station 3-1 by setting, as shown in FIG. 11, the basic receiving frames in the manner that the basic receiving frame from the radio terminal 4(4-2) of the relay station 3-1 is continued without intermission to the basic receiving frame from the radio base station 2 of the relay station 3.

It is more desirable that the frequency (band) used by the relay station 3-1 for reception from the radio terminal 4 (4-2) is used in common with the frequency (band) used for reception from the radio base station 2 in order to eliminate the switching operation of frequency band in the receiving state. For example, a first sub-carrier group belonging to a certain frequency band is used for reception from the radio terminal 4 (4-2) and a second sub-carrier group belonging to the same frequency band is used for reception from the radio base station 2.

Accordingly, in this case, the relay station 3-1 can set the timing which is preceded as much as the length of the basic receiving frame from the radio terminal 4 (4-2) from start of reception of the preamble (leading area of the receiving frame from the radio base station 2-1) from the radio base station 2-1 as the ranging signal reception start (leading area of the receiving frame from the radio terminal) timing from the radio terminal 4 (4-2).

It is desirable for the relay station 3-1 to instruct (a control signal for compensating the timing is generated in the control unit 42 and is then transmitted via the transmission processing device) the radio terminal 4 (4-2) so that the ranging signal reception start timing can be matched with the timing explained above by using the ranging signal received from the radio terminal 4 (4-2).

Finally, an example of the message transmitting and receiving sequence between the radio base station 2 and the relay station 3 is shown in FIG. 12.

As shown in the figure, the relay station 3 receives first the preamble transmitted from the radio base station 2 to set up the synchronization in view of receiving the DL/UL MAP data. The ranging signal is transmitted to the radio base station 2 in the transmission timing with the transmitting channel permitted by the UL MAP data.

The radio base station 2 receives a ranging request signal, obtains by the reception processing device the reception timing deviation (phase shift), receiving frequency deviation and increment/decrement information of necessary transmitting power, generates in the control unit 26 the adjustment information including these contents obtained as the ranging response signal, and then transmits such ranging response signal to the relay station 3 via the MMR link.

Next, the relay station 3 transmits a signal wherein the RSRTG (switching time to transmission from reception) and RSTTG (switching time to reception from transmission) information in the relay station 3 are added to a basic capability request signal. The control unit 42 can previously store these parameters (RSTTG, RSRTG) to the storage unit (not illustrated) and also can use for transmission by reading as required.

Upon reception of the basic capability request signal, the radio base station 2 determines, in the control unit 26, the communication function applied for the relay station 3 in accordance with a terminal class information included in this basic capability request signal and returns the result of determination to the relay station 3 as the basic capability response signal.

Next, the control unit 26 of the radio base station 2 and the control unit 42 of the relay station 3 execute authentication with transmission and reception of a PKM (privacy key management) message. When the relay station 3 is verified as the object allowed to receive services through the authentication, the control unit 2 of the relay station 3 controls transmission of the registration request to the radio base station 2 in order to request entry into the network.

However, this message includes the offset value (time) added.

The control unit 20 of the radio base station 2 checks this offset time whether it is suitable for the radio frame format of the own station through the collation. When this offset time is allowed, it is notified. When the offset time is not allowed, the control unit 20 generates an offset time adjusted by the radio base station 2 as the registration response signal and controls transmission of the signal to the relay station 3.

The offset time may also be designated by the radio base station 2. Namely the relay station 3 notifies a desired time for a candidate of an offset time with a Basic Capability Request and the radio base station notifies a decided offset time to the relay station 3 with a Basic Capability Response wherein the decided offset time is generated based on the desired time.

Accordingly, the control unit 42 of the relay station 3 controls the transmission timing (transmission timing of the preamble) of the transmission processing device and starts transmission of radio signals to the radio terminal 4 under the control thereof in accordance with the offset time notified by the radio base station 2.

The offset time may also be designated to each relay station via the MMR link from the radio base station 2 or may be set separately to the control unit 42 of each relay station.

In addition, transmission of the offset time can also be conducted separately from the registration message.

According to the embodiments described above, radio communication between a relay station and a radio base station is well coordinated with radio communication between a relay station and a radio terminal.

Moreover, according to the embodiments describe above, application efficiency of radio channel can be enhanced and a relay station can be used more effectively.

What is claimed is:
1. A relay station comprising:
a transmitter;
a receiver; and
a controller configured to control the transmitter and the receiver not to allow overlap of a first receiving period for receiving radio signals from a radio base station and a first transmitting period for transmitting radio signals to a radio terminal under control of the relay station,
wherein the controller controls the transmitter to provide a second transmitting period to transmit radio signals to the radio base station following the first transmitting period, and
the controller determines a starting time of the first transmitting period by subtracting a length of the first transmitting period from a starting time of the second transmitting period which is instructed by the radio base station.

2. The relay station according to claim 1, wherein the first transmitting period overlaps a third transmitting period for transmitting radio signals from the radio base station to a radio terminal under control of the radio base station.

3. The relay station according to claim 1, wherein
a preamble signal is included in the radio signals received in the first receiving period and the radio signals transmitted in the first transmitting period.

4. A relay station comprising:
a transmitter;
a receiver; and
a controller configured to control the receiver and the transmitter not to allow overlap of a first transmitting period for transmitting a radio signal to a radio base station and a first receiving period for receiving a radio signal from a radio terminal,
wherein the controller controls the receiver to provide a second receiving period to receive radio signals from the radio base station following the first receiving period, and
the controller determines a starting time of the first receiving period by subtracting a length of the first receiving period from a starting time of the second receiving period which is instructed by the radio base station.

5. The relay station according to claim 4,
wherein the first receiving period overlaps with a third receiving period where the radio base station receives radio signals from a radio terminal under the control of the radio base station.

6. A radio communication system comprising:
a radio base station having a first controller configured to control a transmitting period for transmission of radio signals and a receiving period for receiving radio signals, and
a relay station having a transmitter, a receiver and a second controller configured to control the transmitter and the receiver not to allow overlap of the first receiving period for receiving radio signals form the radio base station and the first transmitting period for transmitting radio signals to a radio terminal under control of the relay station,
wherein the second controller controls the transmitter to provide a second transmitting period to transmit radio signals to the radio base station following the first transmitting period, and
the second controller determines a starting time of the first transmitting period by subtracting a length of the first transmitting period form a staring time of the second transmitting period which is instructed by the radio base station.

7. A radio communication system according to claim 6 wherein the first transmitting period overlaps a third transmitting period for transmitting radio signals from the radio base station to a radio terminal under control of the radio base station.

8. A method of operating a relay station comprising:
controlling, by a controller, a transmitter and a receiver not to allow overlap of a first receiving period for receiving radio signals from a radio base station and a first transmitting period for transmitting radio signals to a radio terminal under control of the relay station,
wherein the controller controls the transmitter to provide a second transmitting period to transmit radio signals to the radio base station following the first transmitting period, and
the controller determines a starting time of the first transmitting period by subtracting a length of the first transmitting period from a starting time of the second transmitting period which is instructed by the radio base station.

9. The method according to claim 8, wherein the first transmitting period overlaps a third transmitting period for transmitting radio signals from the radio base station to a radio terminal under control of the radio base station.

10. The method according to claim 8, further comprising:
including a preamble signal in the radio signals received in the first receiving period and the radio signals transmitted in the first transmitting period.

11. A method of operating a relay station comprising:
controlling, by a controller, a receiver and a transmitter not to allow overlap of a first transmitting period for transmitting a radio signal to a radio base station and a first receiving period for receiving a radio signal from a radio terminal,
wherein the controller controls the receiver to provide a second receiving period to receive radio signals from the radio base station following the first receiving period, and
the controller determines a starting time of the first receiving period by subtracting a length of the first receiving period from a starting time of the second receiving period which is instructed by the radio base station.

12. The method of according to claim 11, wherein the first receiving period overlaps with a third receiving period where the radio base station receives radio signals from a radio terminal under the control of the radio base station.

13. A method of radio communication comprising:
controlling, by a first controller at a radio base station, a transmitting period for transmission of radio signals and a receiving period for receiving radio signals, and
controlling, by a second controller at a relay station, a transmitter and a receiver not to allow overlap of the first receiving period for receiving radio signals from the radio base station and the first transmitting period for transmitting radio signals to a radio terminal under control of the relay station,
wherein the second controller controls the transmitter to provide a second transmitting period to transmit radio signals to the radio base station following the first transmitting period, and
the second controller determines a starting time of the first transmitting period by subtracting a length of the first transmitting period from a starting time of the second transmitting period which instructed by the radio base station.

14. A method according to claim 13 wherein the first transmitting period overlaps a third transmitting period for transmitting radio signals from the radio base station to a radio terminal under control of the radio base station.

* * * * *